United States Patent [19]
Erpenbach et al.

[11] 3,876,693
[45] Apr. 8, 1975

[54] PROCESS FOR INHIBITING POST REACTIONS IN THE CATALYTIC OXIDATION OF PROPYLENE AND/OR ACROLEIN TO PRODUCE ACROLEIN AND/OR ACRYLIC ACID

[75] Inventors: Heinz Erpenbach, Surth; Klaus Gehrmann, Hurth-Knapsack; Winfried Lork, Erftstadt Friesheim, all of Germany

[73] Assignee: Hoechst Aktiengesellschaft, Frankfurt/Main, Germany

[22] Filed: Aug. 7, 1973

[21] Appl. No.: 386,384

[30] Foreign Application Priority Data
Aug. 7, 1972  Germany.............................. 2238851

[52] U.S. Cl........ 260/530 N; 23/288 F; 260/533 N; 260/604 R
[51] Int. Cl...................... C07c 51/32; C07c 57/04
[58] Field of Search......... 260/530 N, 533 N, 604 R

[56] References Cited
UNITED STATES PATENTS
3,717,675   2/1973   Sennewald et al.............. 260/530 N

*Primary Examiner*—Lorraine A. Weinberger
*Assistant Examiner*—Richard D. Kelly
*Attorney, Agent, or Firm*—Connolly and Hutz

[57] ABSTRACT

Vapour-phase oxidation of propylene and/or acrolein with oxygen in the presence of steam to produce acrolein and/or acrylic acid, wherein post-reactions are inhibited. The oxidation is carried out in a reaction zone on a fixed bed catalyst at temperatures between 320° and 450°C. More particularly, the resulting hot reaction gas mixture leaving the reaction zone is directly introduced into a heat exchanger zone placed directly downstream of the reaction zone, and the reaction gas mixture is cooled in said heat exchanger zone, with water having a temperature at least 25°C above the dew point of the reaction gas mixture, down to temperatures between 200° and 300°C. The reaction zone is bounded by a generally cylindrical casing receiving a plurality of individual tubular structures. The structures are adapted to have a fixed bed catalyst placed therein, bundled together and spaced apart from each other by means of two perforated plates sealing the upper end and lower end, respectively, of the casing, and heated by means of a salt melt. The heat exchanger zone receives a similar number of empty, watercoolable tubular structures. The tubular structures accommodated in the two zones are flanged together, so as to open directly into each other, by means of the perforated plates.

3 Claims, 1 Drawing Figure

PATENTED APR 8 1975 3,876,693
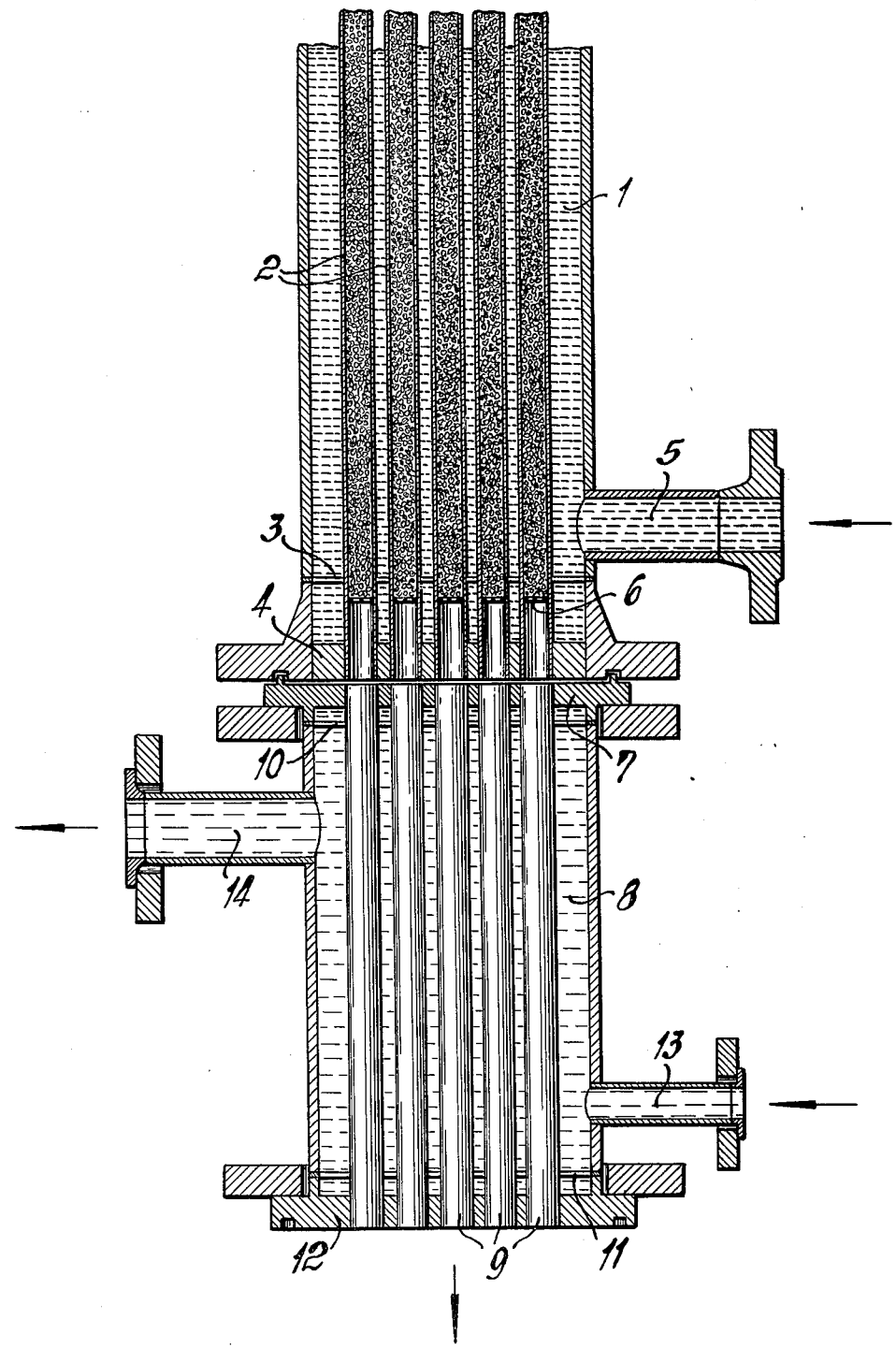

PROCESS FOR INHIBITING POST REACTIONS IN THE CATALYTIC OXIDATION OF PROPYLENE AND/OR ACROLEIN TO PRODUCE ACROLEIN AND/OR ACRYLIC ACID

It is known that acrolein and/or acrylic acid can be produced by subjecting propylene to catalytic oxidation with oxygen or oxygen-containing gases at elevated temperatures and, if desired, under pressure in the presence of diluents including, for example, carbon dioxide, carbon monoxide and particularly steam. Depending on the nature of the catalyst used, it is possible for the reaction to be carried out in a fixed bed, or in a fluidized bed or flow bed reactor. In one known single-passage reaction, a gas stream comprising propylene and/or acrolein, oxygen, nitrogen and steam is passed through a temperature controlled reaction zone which is charged with catalyst; in another known process, in which gas is recycled, a gas mixture comprising propylene and/or acrolein, oxygen, carbon dioxide, carbon monoxide, nitrogen and steam is passed through a reaction zone. The principal reaction products are acrolein and/or acrylic acid, which are obtained together with formaldehyde, acetaldehyde, acetic acid, maleic acid, carbon monoxide, carbon dioxide and acrolein and/or acrylic acid polymers. In carrying out these processes, it is necessary to provide for a certain residual oxygen level in the reaction gases; this is needed to keep the catalyst active, as unreacted propylene has been found to reduce the catalyst, and to affect its selectivity, in all those cases in which there is a deficiency of oxygen.

This measure results, however, in undesirable side reactions between oxygen and the acrolein and/or acrylic acid obtained, which considerably impair the yield and which occur in the spaces (free from catalyst but still at reaction temperature) between the reactor outlet and condenser inlet.

As disclosed in German Patent Specification No. 1242205, it is possible to avoid polymerization of the acrolein within these spaces by passing the reaction gases coming from the reactor through a layer of solid inert material having a surface area of more than 31.5 square metres per cubic metre, preferably more than 195 square metres per cubic metre. It is also possible for the gaseous oxidation product to be cooled down to a temperature about 24°C about its dew point, and for the pre-cooled product to be conveyed through the layer of the material having the high surface area just mentioned. The apparatus described in the above Patent Specification comprises means permitting a layer of inert solid material to be disposed directly downstream of the reaction zone, a heat exchanger positioned downstream of the said layer of solid material, and a further means permitting a second layer of inert solid material to be positioned between the heat exchanger and the condenser.

An adverse effect of this process, which incidentally has been referred to in German published Specification ("Offenlegungsschrift") No. 1910795, page 1, last paragraph, resides in the fact that the polymerization-inhibiting step taken therein does not inhibit homogeneous gas phase reaction between acrolein and oxygen and the resulting combustion of acrolein to carbon oxides (cf. comparative Example 4 hereinafter).

As indicated in German published Specification Offenlegungsschrift NO. 1910795, it is possible to inhibit post-reactions in the catalytic oxidation of propylene and acrolein with air or oxygen to produce acrolein or acrylic acid, by injecting an inert liquid, which volatilizes at the temperatures prevailing, into the reaction gases leaving the reactor. Adverse phenomena encountered in this process reside in the fact that the injected liquid, which vaporizes, brings down the enthalpy of the gases, that a dilute acrylic acid solution is obtained, if use is made of water, and that additional separation is necessary, if use is made of a liquid other than water.

The present invention now provides a process for the vapour-phase oxidation of propylene and/or acrolein with oxygen, or a mixture comprising oxygen and one or more inert gases, in the presence of steam to produce acrolein and/or acrylic acid, wherein post-reactions are inhibited, the oxidation being carried out in a reaction zone on a fixed bed catalyst at temperatures between 320° and 450°C, which process comprises directly introducing the resulting hot reaction gas mixture leaving the reaction zone into a heat exchanger zone placed directly downstream of the reaction zone; cooling the reaction gas mixture in said heat exchanger zone, with water having a temperature at least 25°C above the dew point of the reaction gas mixture, down to temperatures between 200° and 300°C; and further treating the gas mixture so cooled, for the recovery of acrolein and/or acrylic acid, as desired.

The invention also provides an apparatus for carrying out the present process, the apparatus comprising a reaction zone bounded by a generally cylindrical casing receiving a plurality of individual tubular structures adapted to have a fixed bed catalyst placed therein, the said tubular structures being bundled together and spaced apart from each other; two perforated plates sealing the upper end and lower end, respectively, of the generally cylindrical casing, clampingly receiving the individual tubular structures, enabling the spacing therebetween to be maintained and being disposed at the terminal surface areas of the tubular structures; the said tubular structures being adapted to be contacted by a salt melt permitting the said tubular structures to be heated to reaction temperature, upon the salt melt being introduced into the space left between the individual tubular structures; a heat exchanger zone, of similar design to the reaction zone, receiving a similar number of empty, water-coolable tubular structures; the two bundles of individual tubular structures accommodated in the reaction zone and heat exchanger zone, respectively, being flanged together, so as to open directly into each other, by means of the two perforated plates disposed at their respective terminal surface areas.

In the process of the present invention, the reaction of propylene and/or acrolein to produce acrolein and/or acrylic acid can be effected with the use of any applicable oxidic catalysts, which may, for example, comprise oxides of potassium, silver, nickel, cobalt, iron, bismuth, phosphorus and molybdenum. Propylene, for example, should preferably be oxidized with oxygen in the presence of steam with a molar ratio of propylene, oxygen and steam of 1 : (1–2.5) : (0.5 –5) at temperatures between 320° and 450°C in a reactor mounted in an upright position and comprising a plurality of tubular structures charged with catalyst. The tubular structures should preferably have a salt melt circulated around them, the salt melt enabling the reaction temperature to be kept constant. In accordance with the present invention, the reaction gases coming from the reactor are directly delivered to a heat exchanger in which the arrangement of the individual tubular structures is similar to that of the corresponding tubular structures in the reactor. The heat exchanger can be fed with hot water under pressure, this water having a temperature between 90° and 150°C, for example, which is used as a cooling medium and enables the gases to be cooled from the reaction temperatures down to 200°–300°C, and enables the specific heat of the gas to be recovered in the form of steam generated from the cooling water. It is necessary for the cooling water used to have a temperature which is at least 25°C above the dew point of the reaction gas mixture. If this requirement is not met (if use is made of cooling water having a temperature between 20° and 30°C for example), considerable proportions of polymer are found to deposit on the cooling surfaces within a short while (cf. comparative Example 3 hereinafter). The reaction gas mixture cooled down to a temperature between 200° and 300°C can then be introduced into a second reactor, in which the acrolein may be further oxidized to give acrylic acid, or scrubbed with water in all those cases in which acrolein is desired to be produced as the principal reaction product, and the resulting material can be further worked up as desired.

An exemplifying embodiment of the apparatus of the present invention will now be described with reference to the accompanying drawing, of which the single FIGURE is a diagrammatic sectional side view of a reactor and a heat exchanger positioned directly downstream thereof.

As can be seen from the FIGURE, a cylindrical reactor 1 surrounds a plurality of individual tubular structures 2 which are equally spaced apart from each other by means of spacers 3 and of which the lower open ends are fast with (e.g. welded to) a perforated sealing plate 4. The internal width (e.g. 25 mm) of the tubular structures 2 (outer diameter e.g. 35 mm) corresponds exactly to the diameter (e.g. 25 mm) of the individual apertures in the perforated sealing plate 4. The tubular structures 2 are heated from the outside by means of a salt melt which is introduced into the cylindrical reactor 1, through an inlet 5. Each of the individual tubular structures 2 is filled with catalyst, placed on a sieve plate 6. The upper part of the reactor 1 (not shown in the drawing), which contains the reactor inlet, is designed in substantially the same way as the lower part, and is provided with a salt melt outlet.

The lower perforated sealing plate 4 of reactor 1 is flanged on to an upper perforated sealing plate 7 of a heat exchanger 8 in such a manner that the apertures, of identical diameter, in the sealing plates 4 and 7 open directly into each other. In the heat exchanger 8 are housed tubular structures 9, which are identical in number and external width to the tubular structures 2 in reactor 1, and which are spaced apart from each other by means of spacers 10 and 11; the upper open ends of the tubular structures 9 are fast with (e.g. welded to) the inside surface of the upper (7) and a lower (12) perforated sealing plate. The tubular structures 2 and 9, respectively, have identical internal widths and are rectilinearly connected together through the apertures provided in the sealing plates 4 and 7. The tubular structures 9 are surrounded by externally heated water, which is introduced into the cylindrical heat exchanger 8 through an inlet 13 and re- moved therefrom, in the form of steam, through an outlet 14. The reaction gases, which are cooled down to temperatures between 200° and 300°C, leave the tubular structures 9 through the lower perforated sealing plate 12.

The apparatus of the present invention, wherein preheated water is the cooling medium and wherein the gases, which are at their reaction temperature, are indirectly cooled, unexpectedly and completely inhibits homogeneous gas-phase reaction between acrolein and oxygen, and inhibits polymerization in the conduits downstream of the reactor. This is a result which is not reliably produced by merely passing the gaseous reaction product through a layer of solid inert material having a certain surface area, as disclosed in German Patent Specification No. 1 242 205. As already indicated hereinabove, it is possible in accordance with German Patent Specification No. 1242205 to provide additionally for a heat exchanger to intervene between the layers of inert material; this, however, is evidently fed with cold water, as the reaction gases are cooled down to a temperature about 24°C above their dew point, rather than to merely 200°–300°C as proposed in the present invention. Depending on the content of steam therein (between 5 and 40 percent by volume), the reaction gases generally have a dew point between 35° and 80°C.

As compared with the direct cooling of hot reaction gases by injecting water thereinto in accordance with German published Specification Offenlegungsschrift No. 1910795, the present process offers the advantages of utilizing the enthalpy of the gas for the generation of steam, and of yielding concentrated acrylic acid solutions.

EXAMPLE 1

A solid bed reactor encasing a bundle of 30 individual tubular structures, which each had a diameter of 25 mm, was fed with recycle gas which was supplied at an hourly rate of 9 normal cubic metres (S.T.P.) of propylene, 10 normal cubic metres of oxygen, 10.5 normal cubic metres of steam and 40.5 normal cubic metres of carbon dioxide and carbon monoxide. The reactor was filled with a catalyst comprising oxides of silver, iron, bismuth, phosphorus and molybdenum deposited on a $SiO_2$ carrier. The reaction zone was in heat exchange with a salt melt maintained at 365°C. The oxidation of the propylene produced 3.5 normal cubic metres per hour of acrolein in the reaction mixture. The gas mixture, which had a dew point of 65°C and came from the reactor, was directly delivered to a heat exchanger. The heat exchanger also comprised a bundle of 30 individual tubular structures which each had a diameter of 25 mm, and these tubular structures were arranged therein in exactly the same way as the tubular structures in the reactor. The heat exchanger was fed with water under pressure at a temperature of 130°C, which was used for cooling the reaction gases down to 230°C and was transformed into steam at 15 atm. gauge. The cooled reaction gases were introduced into a second reactor in which the acrolein was further oxidized to acrylic acid, or alternatively were delivered to an absorption column in which they were water-scrubbed to recover the reaction products, the latter being purified by distillation. During a 5-month operational period, neither homogeneous gas phase reaction between acrolein and oxygen, nor polymerization within the region between the reactor outlet and the second reactor's inlet or the absorption column inlet, could be found to have taken place.

45.5 percent of the circulated propylene were found to have been converted, and acrolein was obtained in a yield of 85.5 percent, based on the fresh propylene supplied per hour.

EXAMPLE 2

A solid bed reactor encasing a bundle of 30 individual tubular structures, which each had a diameter of 25 mm, was fed with recycle gas which was supplied at an hourly rate of 9 normal cubic metres of propylene, 2 normal cubic metres of acrolein, 10 normal cubic metres of oxygen, 10.5 normal cubic metres of steam and 38.5 normal cubic metres of carbon dioxide and carbon monoxide. The reactor was filled with a catalyst comprising oxides of silver, iron, bismuth, phosphorus and molybdenum deposited on a $SiO_2$ carrier. The reaction zone was in heat exchange with a salt melt maintained at 370°C. The oxidation of the propylene produced 3.0 normal cubic metres per hour of acrolein in the reaction mixture, so that altogether 5 normal cubic metres per hour of acrolein were present in the reaction product coming from the first reactor. The gas mixture, which had a dew point of 72°C and came from the reactor, was directly delivered to a heat exchanger. The heat exchanger also comprised a bundle of 30 individual tubular structures which each had a diameter of 25 mm, and these tubular structures were arranged therein in exactly the same way as the tubular structures in the reactor. The heat exchanger was fed with water under pressure at a temperature of 130°C, which was used for cooling the reaction gases down to 230° C and was transformed into steam of 15 atm. gauge. The cooled reaction gases were introduced into a second reactor, which had dimensions the same as those of the first reactor, in which the acrolein was further oxidized to acrylic acid.

The acrolein was oxidized in contact with a catalyst comprising oxides of cobalt and molybdenum. The reaction zone was in heat exchange with a salt melt maintained at 385°C. The acrolein which was oxidized gave 2.5 normal cubic metres per hour of acrylic acid. The resulting gas mixture, which had a dew point of 64°C and came from the second reactor, was directly introduced into a heat exchanger in which the individual tubular structures were arranged in exactly the same way as in the reactor. The heat exchanger was fed with water under pressure at a temperature of 130°C, which was used for cooling the reaction gases down to 150°C and was converted to steam at 6 atm. gauge. The cooled gases were introduced into an absorption column and water-scrubbed therein, and acrylic acid of 40 weight percent strength was obtained. Carbon dioxide and carbon monoxide were removed as off-gas at a rate which corresponded to the proportion which underwent combustion, and unreacted propylene, oxygen and acrolein together with carbon dioxide, carbon monoxide and steam were recycled to the first reactor, after addition of fresh propylene and oxygen.

41 percent of the propylene and 60 percent of the acrolein under circulation underwent conversion during each passage through the reactor system. Acrolein was obtained in a yield of 81.3 percent, based on the fresh propylene supplied per hour, and acrylic acid was obtained in a yield of 83.3 percent, based on the acrolein converted. This corresponded to an acrylic acid yield of 67.7 percent, based on the fresh propylene supplied per hour.

During a 4-month operational period, neither homogeneous gas phase reaction between acrolein and oxygen, nor polymerization within the region between the first reactor's outlet and the second reactor's inlet, or between the second reactor's outlet and the absorption column inlet, could be found to have taken place.

EXAMPLE 3 (Comparative Example)

The procedure was as described in Example 1, save that the heat exchanger was supplied with cooling water at 20°C which was used for cooling the reaction gases to 230°C and converted to steam at 15 atm. gauge. In clear contrast with the result obtained in Example 1, considerable quantities of polymer were found to have deposited on the cooling surfaces of the heat exchanger after as short an operational period as one week.

The propylene conversion rate of 43 percent and the acrolein yield of 84 percent, based on the propylene used, were substantially of the same order of magnitude as the corresponding data indicated in Example 1. The supply of the heat exchanger with water having a temperature below the dew point of the reaction mixture, however, was found to cause the formation of polymers which handicap commercially reliable operation.

EXAMPLE 4 (Comparative Example)

The procedure was as described in Example 1, save that the heat exchanger was omitted and that the space between the first reactor's outlet and the second reactor's inlet or the absorption column inlet was filled with solid inert material (ceramic, saddle-shaped fillers) having a BET-surface area of 450 square metres per cubic metre. Despite the presence of this layer of solid material, undesirable and uncontrollable side reactions, particularly a homogeneous gas phase reaction between acrolein and oxygen which causes combustion of the acrolein to carbon oxides, were found to occur at various places on passing the reaction gases through the said layer. Almost 80 percent of the 3.5 normal cubic metres per hour of acrolein produced in the reactor were found to undergo noncatalytic combustion within this region and were lost, so that acrolein was obtained in a yield as low as 17 percent, based on the propylene used.

What is claimed is:

1. A process for the vapour-phase oxidation of propylene and/or acrolein with oxygen, or a mixture comprising oxygen and at least one inert gas, in the presence of steam to produce acrolein and/or acrylic acid, wherein postreactions are inhibited, the oxidation being carried out in a reaction zone having a predetermined flow area on a fixed bed catalyst at temperatures between 320° and 450°C, which process comprises: directly introducing the resulting hot reaction gas mixture leaving the reaction zone through substantially said predetermined flow area into a heat exchanger zone placed directly downstream of the reaction zone and having substantially the same predetermined flow area; cooling the reaction gas mixture in said heat exchanger zone, with water having a temperature at least 25°C above the dew point of the reaction gas mixture, down to temperatures between 200° and 300°C.

2. A process as claimed in claim 1, wherein the heat exchanger zone is fed with water having a temperature between 90° and 150°C.

3. A process as claimed in claim 1, wherein the heat exchanger zone is fed with water under pressure.

* * * * *